United States Patent [19]

Hutchings et al.

[11] Patent Number: 4,614,790

[45] Date of Patent: Sep. 30, 1986

[54] MELT PROCESSABLE OPTICALLY ANISOTROPIC POLYESTERS

[75] Inventors: David A. Hutchings, Newark; Gloria M. Sieloff, Pataskala; David M. Lee; G. Fred Willard, both of Newark, all of Ohio

[73] Assignee: Owens-Corning Fiberglas Corporation, Toledo, Ohio

[21] Appl. No.: 668,044

[22] Filed: Nov. 5, 1984

[51] Int. Cl.$^4$ .................. C08G 63/18; C08G 63/68
[52] U.S. Cl. .................... 528/191; 528/176; 528/193; 528/194; 528/271
[58] Field of Search ............. 528/176, 190, 191, 193, 528/194, 271

[56] References Cited

U.S. PATENT DOCUMENTS

| | | | |
|---|---|---|---|
| 3,991,013 | 11/1976 | Pletcher | 528/193 |
| 4,083,829 | 4/1978 | Calundann et al. | 528/193 |
| 4,238,600 | 12/1980 | Jackson, Jr. et al. | 528/190 |
| 4,242,496 | 12/1980 | Jackson, Jr. et al. | 528/176 |
| 4,284,757 | 8/1981 | Fayolle | 528/191 |
| 4,311,824 | 1/1982 | Fayolle | 528/193 |
| 4,342,862 | 8/1982 | Jackson, Jr. et al. | 528/176 |
| 4,360,658 | 11/1982 | Jackson, Jr. et al. | 528/193 |
| 4,416,839 | 11/1983 | Inata et al. | 521/182 |
| 4,447,593 | 5/1984 | Funakoshi et al. | 528/193 |

Primary Examiner—Lester L. Lee
Attorney, Agent, or Firm—Ronald C. Hudgens; Robert F. Rywalski

[57] ABSTRACT

Melt spinnable liquid crystal aromatic polyesters which are optically anisotropic in the melt phase are provided. The polyester is a poly [(1-phenylethylphenylene)/-chlorophenylene terephthalate].

4 Claims, No Drawings

MELT PROCESSABLE OPTICALLY ANISOTROPIC POLYESTERS

TECHNICAL FIELD

The present invention relates to linear polyesters, and, more particularly, it relates to melt processable optically anisotropic liquid crystal polyesters.

BACKGROUND AND SUMMARY

Liquid crystal polyesters, or those which exhibit optical anisotropy in the melt phase, are well known in the art. Numerous patents describe such polyesters and some are, for example, generally described in the article by W. J. Jackson, Jr. appearing in the *British Polymer Journal* December 1980, entitled, "Liquid Crystal Polymers IV Liquid Crystalline Aromatic Polyesters".

Some aromatic polyesters exhibit optical anisotropy in the molten state and can be melt spun into fibers which, upon subsequent heat treatment, substantially increase in tenacity. Such heat treated polyester fibers can be used for numerous purposes such as, for example, in tire cords and in other industrial and consumer products where high strength and low weight with its attendant economic and other advantages are desired. Specific applications for such type liquid crystal polyesters are as high strength reinforcements for numerous thermoplastic and thermosetting polymer materials.

In addition to their use in the form of fibers, such polyesters can also be formed by molding, for example, injection molding, into a wide variety of substrates which will have outstanding stiffness and toughness and strength.

In accordance with the present invention, an improved low cost, high performance thermotropic polyester, which is optically anisotropic in the melt, is manufactured and formed into fibers or molded into other useful articles using conventional thermoplastic polymer processing and forming technology.

The melt spinnable, liquid crystal polymers contemplated herein are of fiber forming molecular weight and exhibit optical anisotropy in the liquid phase and comprise recurring moieties.

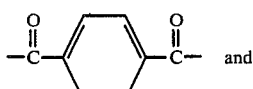

I.

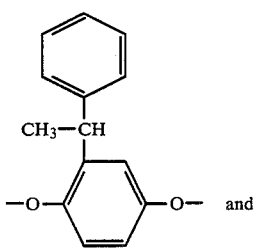

II.

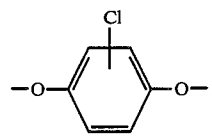

III.

wherein the mole percentage of II (based on units I, II and III) is about 42% to about 33% and the mole percentage of II is about 8% to about 17%.

DESCRIPTION AND INDUSTRIAL EXPLOITATION

The polymers contemplated herein are formed by reacting polyester forming precursors of said moieties under polyester forming reaction conditions. In the preferred mode of practicing the invention, the polymers will be synthesized by a solution polymerization technique in which the precursor for moiety I is terephthaloyl chloride. The precursor for moiety II is (1-phenylethyl)hydroquinone, and the precursor for moiety III is chlorohydroquinone. The (1-phenylethyl)hydroquinone can be manufactured as set forth in U.S. Ser. No. 581,166 which is hereby incorporated by reference. In this solution method, wherein a solvent solution of terephthaloyl chloride is added to a solvent solution of the aryl diols, under polyester forming reaction conditions, it will be found that the proportion of the aryl diol moieties are important. That is, if moiety III is less than about 8 mole percent, a conveniently melt processable polyester is not formed whereas if moiety III is greater than about 17%, the melting points of the polymers are too low (less than about 300° C.) and cannot be readily heat treated in an inert atmosphere to significantly increase the fiber tenacity.

Upon synthesizing and recovering the polymer, the polymer may be formed into usefully shaped articles, as indicated above, by conventional techniques. Thus, for example, the polymer can be extruded and formed into pellets to provide a densified product which product may then be fed to another extruder and formed into various articles such as fibers by use of a spinneret or any suitable die to form films or sheets. In addition, the material may be injection molded into various configurations using conventional injection molding techniques. When formed into fibers, it is important to subject the fibers to a heat treatment. This may be accomplished by simply heating the fibers, with the fibers being in a relaxed condition, in an inert atmosphere, such as, for example, a flow of nitrogen, to a sufficient temperature and for a sufficient period of time to increase the tenacity significantly. That is, increase the tenacity on the order of at least about 50%. Such a heat treatment is also desirable for other objects, e.g., sheets, films and molded articles.

Obviously, the solution polymerization reaction will be conducted in the presence of a hydrochloric acid trap. Suitable hydrochloric acid traps, or scavengers, are the organic bases, for example, aliphatic and aromatic amines, especially tertiary amines. The preferred trap is pyridine, and it is preferred to employ an excess, for example, up to about 50 percent molar excess of such material. The solvents employed for the solution polymerization will be routinely selected by those skilled in the art, but it is generally preferred to employ the low molecular weight chlorinated hydrocarbons, such as, for example, the fully or partially chlorinated $C_1$–$C_3$ alkanes like trichloromethane, trichloroethane and dichloromethane, with dichloromethane being preferred.

While the above describes the present invention with sufficient particularity to enable those skilled in the art to make and use same, nonetheless, a method of industrially exploiting the present invention follows.

EXAMPLE

Into a 500 ml round-bottom flask equipped with a magnetic stirrer and an addition funnel, there was charged about 0.05 moles of a mixture of (1-phenylethyl)hydroquinone and chlorohydroquinone. The mixture was in a molar ratio of 5(1-phenylethyl)hydroquinone:1chlorohydroquinone). The flask also contained 90 ml of methylene chloride and 15 ml of pyridine and was maintained under a nitrogen atmosphere. The mixture was cooled to about 25° C., and into this mixture there was then added dropwise (over approximately a one-hour period) a solution of 0.05 moles of terephthaloyl chloride and 90 ml of methylene chloride. During the addition, the temperature was maintained below about 25° C. After the addition, the reaction mixture was allowed to stir for an additional 18 hours with the temperature being maintained at about 25° C. Subsequently, the reaction mixture was added to 500 ml of acetone, heated to boiling with vigorous stirring for five minutes, cooled to room temperature and filtered. The resulting polymer was then added to 250 ml of water, brought to a boil with vigorous stirring, cooled to room temperature and again filtered. The polymer was then washed with boiling acetone for five minutes, cooled to room temperature and filtered. Prior to fiberization, the polymer was dried at 125° C. (25 mm mercury) for 18 hours. The dried polymer had a melting point of about 300° C.

Using a glass test tube fiberizer which had a hole of approximately 0.06 inches in diameter, fibers having a diameter of less than about 20 microns were formed using windup rates varying on the order of between about 50 to about 750 feet per minute. Individual fibers, in a relaxed state, were then heat treated to substantially increase their tenacity. The heat treatment employed used a flow of nitrogen, and the fibers were heated in such nitrogen under the following sequential conditions: 25° to 150° C. for one hour; 150° to 175° C. for one hour; 175° to 200° C. for one hour; 200° to 225° C. for one hour; 225° to 250° C. for one hour; 250° to 300° C. for one hour; and, finally, 300° to 320° C. for 14 hours. The fibers typically had a tenacity of between about 7.3 to about 11.5 grams per denier (calculated based on a measurement of Instron break load using 12.7 millimeter gauge length at a rate of 2 mm per minute and a measurement of density and the fiber cross-sectional area); a tensile modulus typically between about 182 to about 416 grams per denier and an elongation of between about 3.5 to 4.7 percent to break.

While the above describes the present invention, it will, of course, be apparent that modifications are possible which, pursuant to the patent statutes and laws, do not depart from the spirit or the scope thereof.

We claim:

1. A melt spinnable liquid crystal polyester which is optically anisotropic in the melt phase and of fiber forming molecular weight and capable of being heat treated in fiber form to increase tenactiy said polyester consisting essentially of recurring moieties of formulas:

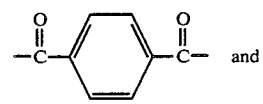

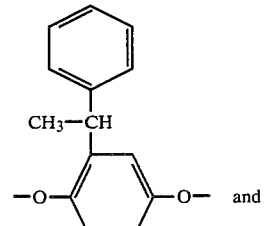

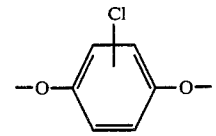

wherein the mole percentage of I is 50%, and the mole percentage of II is about 33% to about 42% and mole percentage of III is about 8% to about 17%, and wherein said polyester is prepared by adding an organic solvent solution of terephthaloyl chloride to an organic solvent solution of a mixture of (1-phenylethyl)hydroquinone and chlorohydroquinone and reacting said materials.

2. A heat treated fiber formed of the polyester of claim 1.

3. A film formed of the polyester of claim 1.

4. A molded article formed of the polyester of claim 1.

* * * * *